(12) United States Patent
Makhija et al.

(10) Patent No.: US 11,675,839 B2
(45) Date of Patent: Jun. 13, 2023

(54) DATA PROCESSING IN ENTERPRISE APPLICATION

(71) Applicant: NB Ventures, Inc., Clark, NJ (US)

(72) Inventors: Subhash Makhija, Westfield, NJ (US); Saratendu Sethi, Apex, NC (US); Shashvat Bharti, Himachal Pradesh (IN)

(73) Assignee: NB Ventures, Inc., Clark, NJ (US)

( * ) Notice: Subject to any disclaimer, the term of this patent is extended or adjusted under 35 U.S.C. 154(b) by 29 days.

(21) Appl. No.: 17/313,680

(22) Filed: May 6, 2021

(65) Prior Publication Data

US 2022/0358163 A1 Nov. 10, 2022

(51) Int. Cl.
*G06F 16/00* (2019.01)
*G06F 16/901* (2019.01)
*G06F 16/951* (2019.01)
*G06F 16/33* (2019.01)
*G06F 16/35* (2019.01)
*G06F 40/284* (2020.01)
*G06F 40/205* (2020.01)
*G06F 40/30* (2020.01)
*G06F 18/2321* (2023.01)
*G06F 18/2413* (2023.01)

(52) U.S. Cl.
CPC ...... *G06F 16/9024* (2019.01); *G06F 16/3344* (2019.01); *G06F 16/3347* (2019.01); *G06F 16/35* (2019.01); *G06F 16/951* (2019.01); *G06F 18/2321* (2023.01); *G06F 18/24137* (2023.01); *G06F 40/205* (2020.01); *G06F 40/284* (2020.01); *G06F 40/30* (2020.01)

(58) Field of Classification Search
CPC ...... G06F 40/174; G06F 21/55; G06F 21/552; G06F 21/554; G06F 11/3438; G06F 11/3476; G06F 2201/81; G06F 2201/86; G06F 11/0778; G06F 11/079; G06F 16/285; G06F 3/04883; G06F 3/0482; G06F 3/04886; G06F 3/017; G06F 3/0488; G06F 2203/04808; G06F 3/0481; G06F 3/04842; G06F 3/04845; G06F 3/0485; G06F 3/0486; G06F 3/0483; G06F 3/04166; G06F 3/0484; G06F 40/134; G06F 1/1626; G06F 1/1643; G06F 1/3206; G06F 1/3215
See application file for complete search history.

(56) References Cited

U.S. PATENT DOCUMENTS

| | | | |
|---|---|---|---|
| 8,166,039 B1 * | 4/2012 | Haveliwala | G06F 16/3347 707/741 |
| 9,843,596 B1 * | 12/2017 | Averbuch | G06F 21/554 |
| 11,323,570 B1 * | 5/2022 | Lamba | G06K 9/6263 |
| 2014/0324752 A1 * | 10/2014 | Statnikov | G06F 17/18 706/46 |
| 2020/0193552 A1 * | 6/2020 | Turkelson | G06V 10/454 |

* cited by examiner

*Primary Examiner* — Shyue Jiunn Hwa
(74) *Attorney, Agent, or Firm* — David M. Breiner; BrownWinick Law Firm (57) ABSTRACT

The present invention relates to data processing system and method in supply chain application. The data processing system includes clustering of received supply chain data after normalization, tokenization and vectorization through graph-based analysis.

20 Claims, 8 Drawing Sheets

Original Supplier Name: Microsoft India Limited
Normalized Supplier Name: MICROSOFT INDIA LTD
Supplier Name for Vectorization: microsoftindia
Tokenized Supplier Name: ['micro', 'icros', 'croso', 'rosof', 'softi', 'oftin', 'ftind', 'tindi', 'india']
TF-IDF Vector:
[0.99591599  0.50297529  0.62509898  0.90500854  0.22410878  0.97409724  0.14364194
0.30347311  0.07624058  0.65632375]

| ID | Supplier Name | Supplier Name Cluster | DUNS Number Cluster | Phone Number Cluster |
|---|---|---|---|---|
| 1 | Dell India Limited | 1 | - | - |
| 2 | Dell IND | 1 | 1 | - |
| 3 | Doll | 2 | 1 | - |
| 4 | Microsoft | 3 | - | 1 |
| 5 | Mocrosoft | 3 | - | - |
| 6 | マイクロソフト | 4 | - | 1 |
| 7 | マイクロソフトジャパン | 4 | - | - |

DATA PROCESSING IN ENTERPRISE APPLICATION

BACKGROUND

1. Technical Field

The present invention relates generally to data processing. More particularly, the invention relates to systems, methods and computer program product for data processing and normalization in enterprise application including supply chain application.

2. Description of the Prior Art

In large databases and enterprise application systems, there is a high probability that the same entity is presented in multiple entries with minor differences leading to difficulty in analysis and redundancy in database. Having duplicates in the entity data master leads to incorrect reporting for spend and material analysis in case of supply chain applications. Since, entity data is continuously received in the database, to eliminate duplicate entries in a dynamic environment is extremely cumbersome.

Since, entity data is obtained from several sources within an enterprise, it is extremely critical to identify and capture entity data with different attributes to enable processing of the data under the same entity. Moreover, in case of enterprise application such as supply chain management applications, the distinct data sources such as Purchase order, Invoicing, account Ledger, etc., presents unique challenges related to the nature of data attributes to be assessed for avoiding errors.

Further, the supply chain application requires consolidation of multiple instances of the entity which have live documents associated with them into one legal name (say lead entity like a lead supplier), taking into account typos and misspelled names, abbreviations, appended numeric codes, multiple legal entities, and different punctuations etc.

The entity data processing and management process can be time-consuming and labor-intensive, requiring dedicated human resources. Further, the typical process is primarily manual and therefore inefficient and prone to human error. Even with some of the automation techniques the chances of error are very high as the parameters assessed and data processing technique deployed for identifying the duplicates provide conceptually inaccurate results. For Eg; in case of supplier name for a supply chain management application, different units of an entity may address the same supplier with multiple abbreviations or names, which creates lots of confusion and inaccurate accounting practices. Moreover, the nature of data flowing in a supply chain application is distinct and raises concerns in case mis-spelt data is introduced in the application from a data source. Such situations, present multiple challenges particularly when the volume of data to be addressed is humongous. The existing technologies utilize known techniques of data processing for data cleansing and normalization but in case of enterprise application such as supply chain applications, the nature if data itself is extremely different which requires distinct processing to achieve more accurate and faster results.

Accordingly, there is a need in the art for improved systems and methods of data processing for managing multiple distinct data in supply chain applications.

SUMMARY

In an embodiment the present invention discloses a method of data processing in enterprise application including supply chain application. The method includes the steps of receiving and analyzing one or more dataset to assign a unique identifier to the received dataset; normalizing one or more data fields associated with each of the one or more dataset to generate a normalized dataset; enriching a parent data through mapping of the parent data by the normalized dataset; processing the normalized dataset through tokenization and vectorization to generate sparse vectors; and clustering the one or more normalized dataset based on the one or more data fields and the sparse vectors wherein one or more clusters is created on one or more data attribute associated with each of the one or more data fields and each of the clusters are linked. Further, the linked clusters enable data normalization, de-duplication and removal of erroneous or mis-spelt data related to an entity or object within the supply chain application. Since, the method deploys clustering technique that modifies the processing based on the distinct data fields associated with different datasets to be processed in supply chain application, the clustering technique reduces the processing time through dynamically generated data mapping script and also achieves more accurate results with appropriately linked clusters, scales to handling very large datasets (for example, 1 billion datapoints) and works across data entities in multi-languages.

In a related embodiment, clustering based on name as data field includes the step of vectorization by generating character wise TF-IDF vectors as the sparse vectors for at least one of the one or more tokenized data fields, normalizing the TF-IDF vectors, determining distance between normalized TF-IDF vectors and respective cluster center by $d(P, q)=\text{sqrt}(\text{sum}\_i(q\_i-P\_r)^2))$; where, P is a centre of a cluster which is determined as a mean of all TF-IDF vectors of data points within that cluster; q is TF-IDF vector of the cluster; q_i is TF-IDF weight of $i^{th}$ word determined as a raw count in the data name normalized by its inverse document frequency (IDF) across a corpus; and P_i is a mean of TF-IDF weight of the $i^{th}$ word across all the TF-IDF vectors in the cluster.

In another related embodiment, the data processing method includes creating an empty graph, adding data field as vertices of the graph, plotting the clusters based on individual attributes as nodes on the graph, connect the clusters using the edges based on clusters formed on each columns, extracting one or more disconnected sub-graphs and assigning each sub-graph a cluster identifier and mapping the assigned cluster identifier to the dataset using nodes.

In an embodiment, the present invention provides a data processing system for supply chain application. The system includes a server configured to receive and analyze one or more dataset for assigning a unique identifier to the received dataset; a controller encoded with instructions enabling the controller to function as a bot for initiating a data cleansing and normalization operation for normalizing one or more data fields associated with each of the one or more dataset to generate a normalized dataset; data enrichment tool configured for enriching a parent data through mapping of the parent data by the normalized dataset; and a processor configured to process the normalized dataset through tokenization and vectorization to generate sparse vectors; and an AI engine for clustering the one or more normalized dataset based on the one or more data fields and the sparse vectors wherein one or more clusters is created on one or more data attribute associated with each of the one or more data fields and each of the clusters are linked.

In a related embodiment, the server of the data processing system includes a front end web server communicatively coupled to at least one SQL server, wherein the front end web server is configured to reprocess the clustering based on the data script by receiving at least one cluster processed by the SQL server and applying an AI based dynamic processing logic to the cluster to automate a cluster linking operation.

In an embodiment, the present invention provides a computer program product for data processing in supply chain application using multiple integrated tools configured for clustering. The product includes a computer readable storage medium readable by a processor and storing instructions for execution by the processor for performing the method of data processing.

In an advantageous aspect, the present invention utilizes Machine Learning algorithms and advanced AI based cluster linking techniques through a data mapping script for linking one or more clusters.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Described herein are the various embodiments of the present invention, which includes a method and a system of data processing using an artificial intelligence engine in a supply chain application.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "data," "supplier name," or "transactions," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to a system and method for data processing with multiple integrated tools configured for generating normalized, cleansed and enriched data with cluster confidence score while working on many applications including but not limited to enterprise application.

Figure 1:
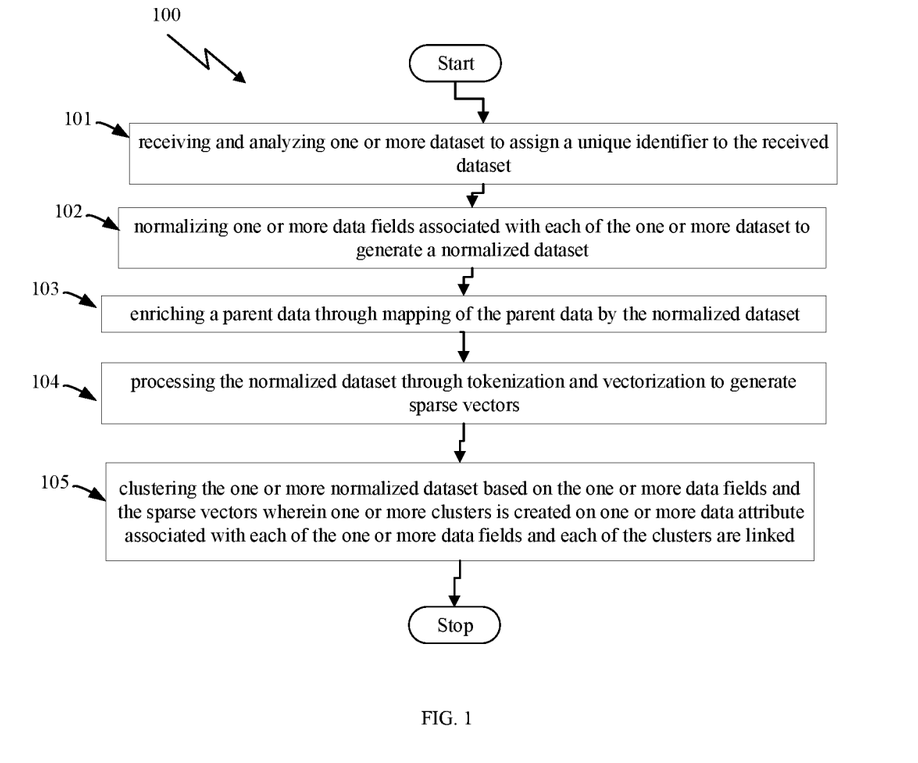
FIG. 1 is a flowchart depicting a method of data processing in accordance with an embodiment of the invention.

Referring to FIG. 1, a flowchart 100 depicting a data processing method for supply chain application is provided in accordance with an embodiment of the present invention. The method includes the steps of receiving and analyzing one or more dataset to assign a unique identifier to the received dataset in step 101. In step 102 normalizing one or more data fields associated with each of the one or more dataset to generate a normalized dataset. In step 103 enriching a parent data through mapping of the parent data by the normalized dataset and processing the normalized dataset through tokenization and vectorization to generate sparse vectors in step 104. In step 105 clustering the one or more normalized dataset based on the one or more data fields and the sparse vectors wherein one or more clusters is created on one or more data attribute associated with each of the one or more data fields and each of the clusters are linked.

In an embodiment, the clustering tool includes machine learning engine (MLE) and AI engine for obtaining the confidence score of the cluster.

In an embodiment, the confidence score is determined based on distance of a data member from a center of the cluster. The closer a member of the cluster is to its center, the more likelihood of it being a member since the clustering is based on density (Density based Spatial clustering).

Figure 1A:
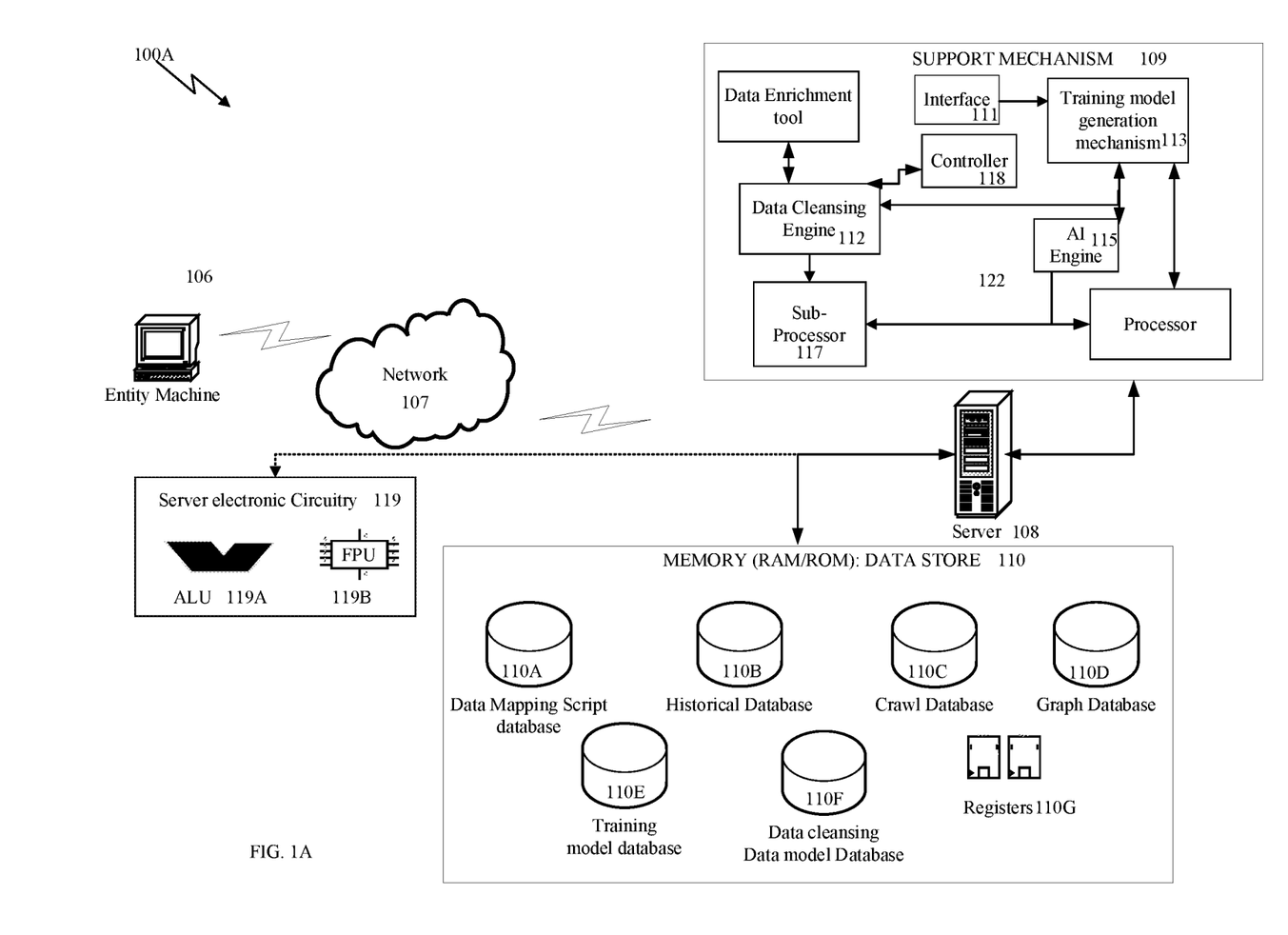
FIG. 1A is a view of a data processing system in accordance with an embodiment of the invention.

Referring to FIG. 1A, a system for data processing is provided in accordance with an embodiment of the present invention. The system 100A includes at least one entity machine 106 for sending data over a network 107. The system further includes a server 108 configured to receive the data from the entity. The system 100A includes a support mechanism 109 for performing data processing functions depending upon the type of entity i.e registered or unregistered/new and the type of data received at the server 108. The system 100A includes a memory data store 110 for accessing data from the entity and also storing plurality of training data models, data scripts and data model script created by support mechanism 109. The system includes an AI based identification data script for determining unknown information of the received data.

In an embodiment the server 108 of the invention may include various sub-servers for communicating and processing data across the network. The sub-servers include but are not limited to content management server, application server, directory server, database server, mobile information server and real-time communication server.

In an embodiment the entity machine 106 may communicate with the server 108 wirelessly through communication interface, which may include digital signal processing circuitry. Also, the entity machine 106 may be implemented in a number of different forms, for example, as a smartphone, computer, personal digital assistant, or other similar devices.

In an example embodiment, the support mechanism 109 of the system 100A includes an interface 111 for accessing information received at the server 108. The support mechanism further includes a data cleansing and normalization engine 112 for cleansing and normalizing data already available with the data store 110 of the system 100A and also cleansing of the received data at the server 108. The support mechanism 109 includes a training data model generation mechanism 113, a processor 114 configured for performing various functions including but not limited to process normalized dataset through tokenization and vectorization to generate sparse vectors, an AI engine 115 coupled to the processor 114 and configured for clustering the one or more normalized dataset based on one or more data fields and the sparse vectors. The processor 114 is configured for enabling normalization of received data depending on the training models of the model generation mechanism 113, selecting appropriate processing and clustering tools, enabling AI engine 115 to integrate data script and classify received data with cluster identifiers (Cluster ID).

In a related embodiment, for enrichment of parent data through mapping of the parent data by the normalized dataset the support mechanism 109 of the system 100A further includes a data enrichment tool 116. The system also includes a sub-processor 117 configured for processing the received data, a data object of the received dataset by analyzing and abbreviating before mapping the parent data with abbreviated data object. The mapping of the parent data is executed by a bot through a data mapping script. The support mechanism includes a controller 118 encoded with instructions enabling the controller to function as a bot for initiating a data cleansing and normalization operation for normalizing one or more data fields associated with each of the one or more dataset to generate a normalized dataset.

In example embodiment the server 108 shall include electronic circuitry 119 for enabling execution of various steps by the processor. The electronic circuitry has various elements including but not limited to a plurality of arithmetic logic units (ALU) 119A and floating-point Units (FPU) 119B. The ALU enables processing of binary integers to assist in formation of a cluster matrix of variables where the data training model is applied to the matrix for obtaining confidence score of the cluster. In an example embodiment the server electronic circuitry 119 as shown in FIG. 1A, includes at least one Athematic logic unit (ALU) 119A, floating point units (FPU) 119B, other processors, memory, storage devices, high-speed interfaces connected through buses for connecting to memory and high-speed expansion ports, and a low speed interface connecting to low speed bus and storage device. Each of the components of the electronic circuitry 119, are interconnected using various busses, and may be mounted on a common motherboard or in other manners as appropriate. The processor can process instructions for execution within the server 108, including instructions stored in the memory or on the storage devices to display graphical information for a GUI on an external input/output device, such as display coupled to high speed interface. In other implementations, multiple processors and/or multiple busses may be used, as appropriate, along with multiple memories and types of memory. Also, multiple servers may be connected, with each server providing portions of the necessary operations (e.g., as a server bank, a group of blade servers, or a multi-processor system).

The processor 114 may be implemented as a chipset of chips that include separate and multiple analog and digital processors. The processor 114 may provide coordination of the other components, such as controlling user interfaces, applications run by devices, and wireless communication by devices.

The Processor 114 may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user and convert them for submission to the processor. In addition, an external interface may be provided in communication with processor 114, so as to enable near area communication of device with other devices. External interface may provide, for example, for wired communication in some implementations, or for wireless communication in other implementations, and multiple interfaces may also be used.

Referring to FIG. 1A, the various elements like the support mechanism 109, the memory data store 110 are shown as external connections to the server 108 in accordance with an embodiment of the invention. However, it shall be apparent to a person skilled in the art that these elements may be part to an integrated server system. Also, some of the sub-elements of the support mechanism 109 and the memory data store 110 either alone or in various combinations may be part of a server system as other external connections.

In an example embodiment, the memory data store 110 includes plurality of databases as shown in FIG. 1A. The data store 110 includes a data mapping script database 110A for storing dynamically generated data scripts configured for generating mapping relations to link clusters by processing at least one data attribute associated with received dataset based on a dynamic processing logic, a historical database 110B for storing historical dataset such as historical spend data, a crawl database 110C configured for storing crawl dataset where the mapping of the parent data through the data mapping script is obtained from the crawl dataset and the historical dataset. The data store 110 includes a graph data base 110D configured for storing graph structures for semantic queries with nodes, edges and properties to represent and store data, a training model database 110E configured for storing a plurality of training models required to classify the received data for clustering, a data cleansing data model database 110F for storing a plurality of data models configured for cleaning and normalization of datasets received from a plurality of entities, a plurality of registers 110G as part of the memory data store 110 for temporarily storing data from various databases to enable transfer of data by the processor 114 between the databases as per the instructions of the AI engine 115 to enable formation of clusters and obtain confidence score of the clusters.

In an exemplary embodiment, the graph database 110D includes nodal connections of similar cluster values wherein the received data is added to the graph database for identifying the clusters wherein a connection of a normalized dataset with a cluster in the historical database is formed if a node in the graphical database with values similar to the normalized and vectorized dataset is present else a new node for the received dataset is to be formed. The graph database 110D enables comparison of normalized dataset with only related cluster to which the normalized dataset may be connected through a property/relation where a similarity score is computed between the nodes.

The dynamic processing logic integrates deep learning, predictive analysis, information extraction, optimization and bots for processing the at least one data subset.

The memory data store 110 may be a volatile, a non-volatile memory or memory may also be another form of computer-readable medium, such as a magnetic or optical disk.

The memory store 110 may also include storage device capable of providing mass storage. In one implementation, the storage device may be or contain a computer-readable medium, such as a floppy disk device, a hard disk device, an optical disk device, or a tape device, a flash memory or other similar solid-state memory device, or an array of devices, including devices in a storage area network or other configurations.

In an embodiment, the historical database 110B includes information about the historical dataset to enable selection of the classification tool based on data attributes associated with the data objects of the received dataset. The data mapping script database 110A includes dynamically generated data models related to at least one parent data. The data mapping script is created by the bots based on the at least one data subset and the cleansed enriched data stored in the historical database 110B.

The computing devices referred to as the entity machine, server, processor etc. of the present invention are intended to represent various forms of digital computers, such as laptops, desktops, workstations, personal digital assistants, and other appropriate computers. Computing device of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

In an embodiment, the received data is an item data, supplier data or a data string extracted from at least one data source. Further, the one or more data field associated with the received dataset includes name, address, email ID, service ID, tax number, contact number, unique IDN, item master ID, item data attributes etc.

Figure 2:
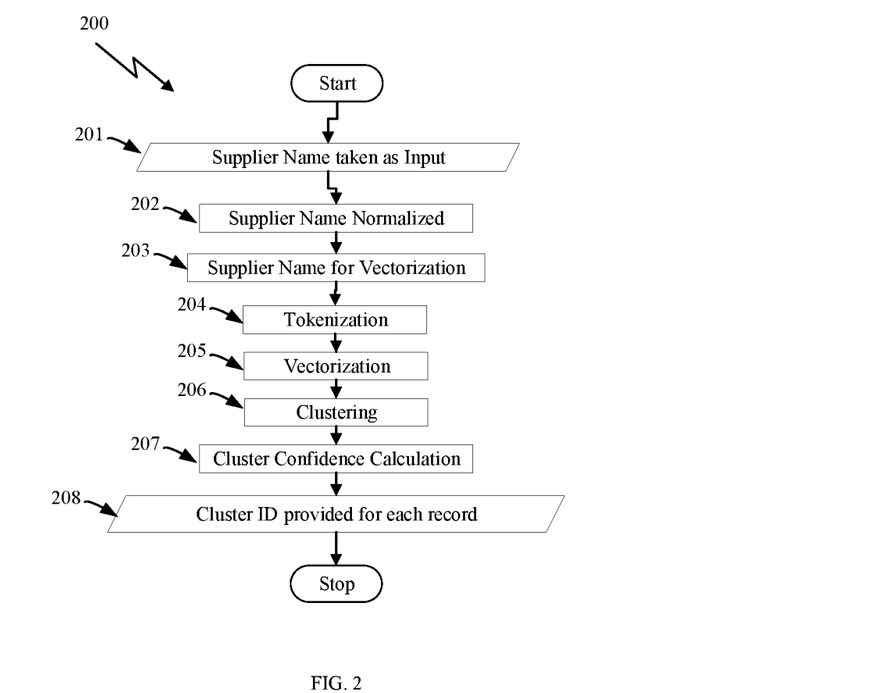
FIG. 2 is a flowchart depicting a method of data processing for supplier name normalization in accordance with an embodiment of the invention.
Figure 2A:
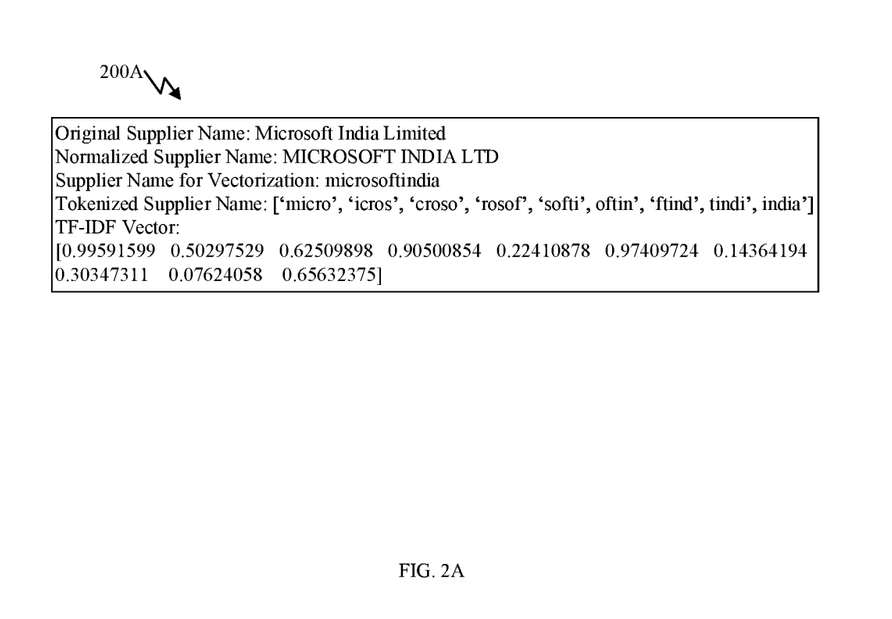
FIG. 2A is a screen showing Tokenization of a supplier name in accordance with an embodiment of the invention.

Referring to FIG. 2, a flowchart 200 depicting detailed method of supplier data processing in supply chain application is provided in accordance with an example embodiment of the invention. The method includes the steps of receiving Supplier Name as Input received dataset, normalizing the Supplier Name, Cleansing the Supplier Name to prepare the name for clustering by removing junk words in the received dataset, removing legal entities such as private limited etc, removing spaces where it shall be noted that not having spaces in terms of proper nouns work better than one with spaces. The method includes tokenizing the supplier name with Character based tokenization and moving window of 5 as shown by screen 200A in FIG. 2A. In case the length of supplier name is <5 (e.g. xyz) the token is the largest possible string (in this case, the largest possible string will be "xyz"). For eg: Character wise n-gram (n=5) TF-IDF vector is generated for supplier name (Train and transform at run time). e.g. ABCDE would be tokenized as ["ABCDE", "BCDE"] and then would be used for TF-IDF values. Further a normalization is performed on the vectors and less important data elements/attributes of the received data (e.g. technology, consulting etc) are oversampled to give them less importance.

The method further includes vectorization with TF-IDF vectors where the TF-IDF used in order to reduce importance of terms that might not add too much value to clustering but still have enough influence that they cannot be removed in the pre-processing steps (e.g. "technology" in "ABC technology"). While training the vectorizer, oversampling of line of business (e.g. technology, consultancy etc) by n/2 times is done where n is the length of unique supplier names obtained after cleansing of the received data. In this above example, the value is for representation only and in practice a sparse vector is obtained. The method includes Clustering where the input for clustering is the TF-IDF vectors obtained earlier and the metrics is Distance between the vector and centre of the cluster which is obtained by $d(P, q)=sqrt(sum\_i(q\_i-P\_i)^2))$; where, P is a centre of a cluster which is determined as a mean of all TF-IDF vectors of data points within that cluster; q is TF-IDF vector of the cluster; $q\_i$ is TF-IDF weight of $i^{th}$ word determined as a raw count in the data name normalized by its inverse document frequency (IDF) across a corpus; and $P\_i$ is a mean of TF-IDF weight of the it word across all the TF-IDF vectors in the cluster.

Further, the minimum member in the cluster is 1 but it can have a supplier which does not belong to any cluster.

Figure 2B:
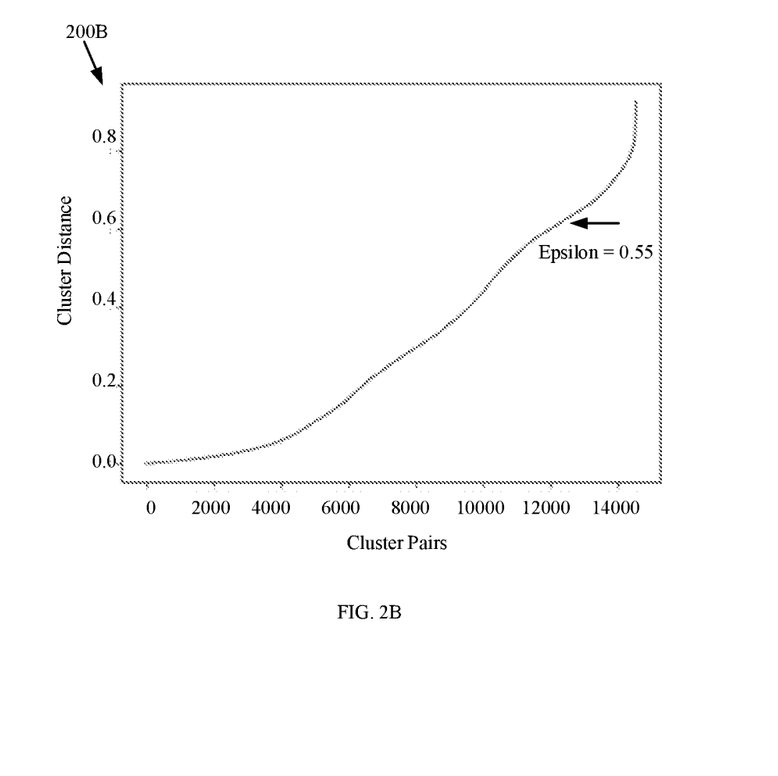
FIG. 2B is a graph depicting cluster distance as part of data processing in supply chain application in accordance with an embodiment of the invention.

In an exemplary embodiment, the cluster uses a value of Epsilon as 0.55 which is dynamically determined using a K distance graph where K=1. Referring to FIG. 2B a graph 2000B plotting the cluster distance and epsilon value 0.55 is shown as an example. The AI engine of the invention dynamically sets a threshold epsilon value based on the received dataset for clustering to obtain a cluster identifier or label. The clustering process provide a Cluster ID or label as the Output. The supplier data processing method further includes the step of determining Cluster confidence where for each cluster, the geometric centre is calculated. The TF-IDF vectors that received the same cluster ID as above are taken and their mean is determined. For each entry, distance from its respective centre is calculated (point A is the centre of the cluster, Point B is given by the vector from above).

In a related embodiment, based on the distance from the centre, a confidence bucket (high, medium, low) is generated. The closer a member of the cluster is to its centre, the more likelihood of it being a member since the clustering is based on density. For eg: the following confidence buckets may be used: <=0.5, HIGH; >0.5 and <=0.7, MEDIUM; >0.7, LOW; Default: No Confidence.

Figure 3:
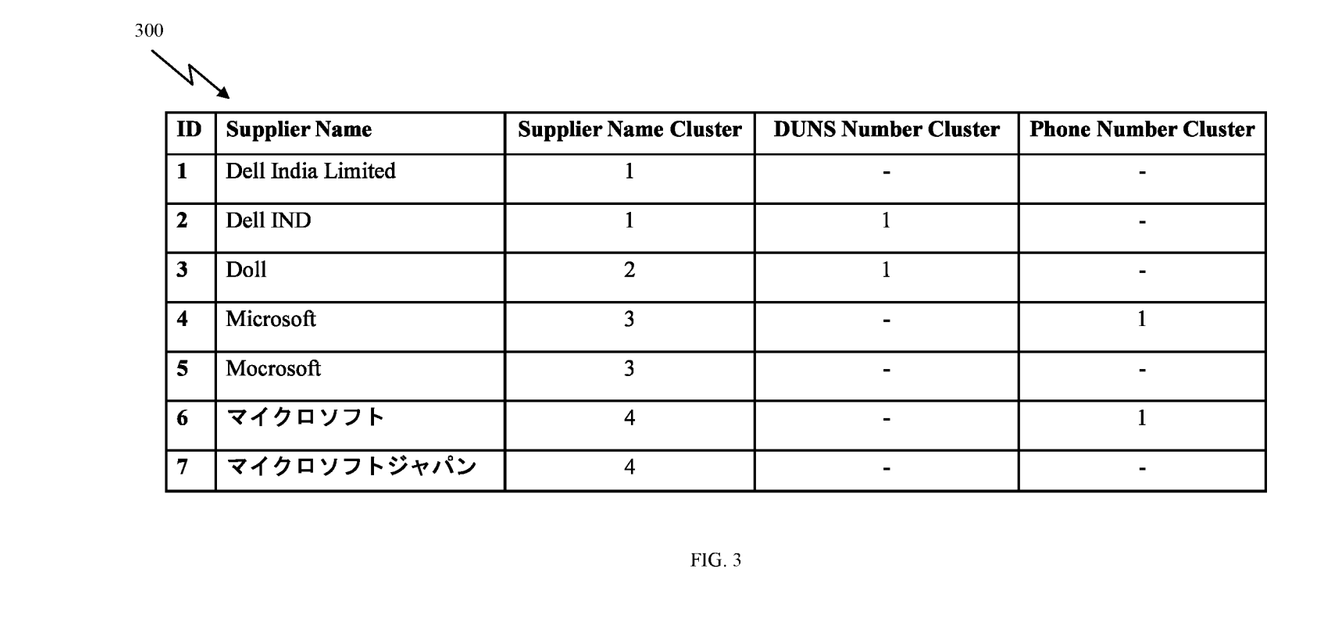
FIG. 3 is a table depicting clustering based on various attributes in accordance with an example embodiment of the invention.

Referring to FIG. 3 a table 300 depicting clustering based on various attributes is provided in accordance with an example embodiment of the invention.

Figure 3A:
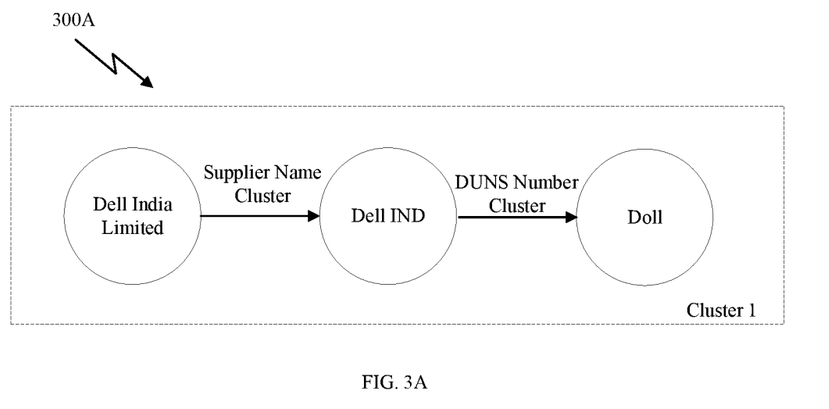
FIGS. 3A and 3B, graphs representing cluster 1 and cluster 2 of the data processing method in supply chain in accordance with an example embodiment of the invention.
Figure 3B:
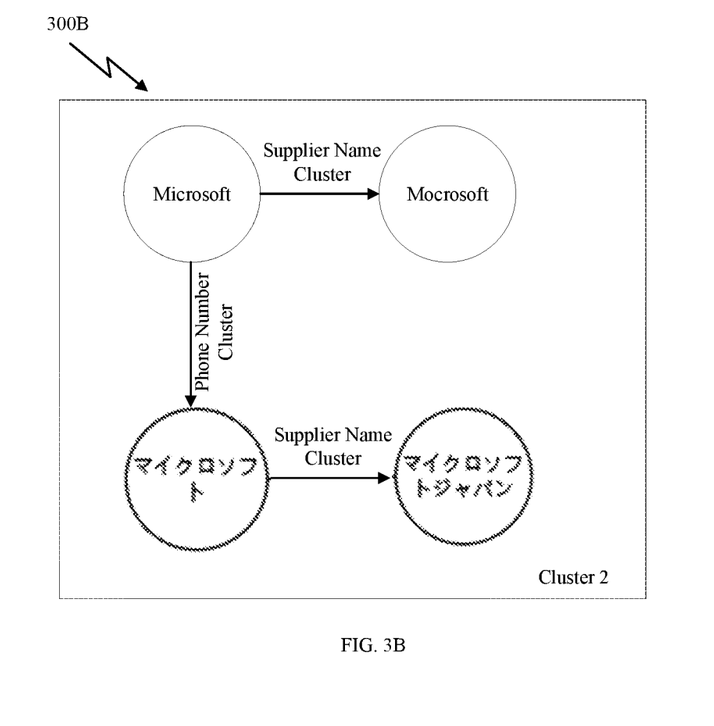

Referring to FIGS. 3A and 3B, a graph representation of cluster 1 (300A) and cluster 2 (300B) is shown in accordance with an example embodiment of the invention. The method of data processing for graph representation includes creating an empty graph and adding all supplier names as vertices of the graph. The edges of the graph are created as:
a. Dell India Limited and Dell IND are connected to each other due to supplier name based clustering;
b. Dell IND and Doll (A typo for dell) are connected to each other because of DUNS number clustering. The two can be connected due to more than one attribute (e.g. it can be connected due to DUNS number, supplier name and phone number), nothing will change as the system is only using this show association and not the strength of it;

c. Microsoft is connected to Mocrosoft (a typo) due to supplier name cluster and it is also connected to Microsoft written in Japanese due to phone number cluster.

d. Microsoft (in Japanese) is connected to Microsoft Japan (in Japanese) because of name based cluster.

Further, the method includes identifying disconnected subgraphs and assign a cluster ID to each subgraph (cluster 1 and cluster 2). These Cluster IDs are used as the final cluster.

In an embodiment, the invention includes abbreviation technique for data abbreviation of supplier name. The method for abbreviation includes:

Checking if a name is an abbreviation or full name
a. after removing legal entities and country names, check the length of the name
b. length <=3 is tagged as an abbreviation, length >3 is tagged as a full name, length =0 is tagged as none All the names marked as "full name" are converted to their abbreviations (e.g. United Postal Services is converted to UPS)

Map to abbreviation:
a. A composite key of Ultimate parent and abbreviated supplier name is created and mapped to suppliers tagged as "abbreviation"
b. If a supplier name is not mapped by the previous step, a composite key of Category and abbreviated supplier name is created and mapped to the remaining abbreviations
c. In case both the steps fail to provide a value, the supplier is left as is and eventually treated as a different supplier.

In one example embodiment, the data processing method in supply chain application may be depicted from an example algorithm as below:

Reading input data file
a. excel and parquet files are supported. Also, adding support for reading from a database (DB);
b. store the list of all original input columns so that the same columns can be maintained in the final file;
c. add a unique ID column. User specified ID is not used because the user tends to have duplicate IDs, Check the file schema
a. Checking if all the necessary columns are present;

Normalizing all input columns and cleaning received dataset for eg: supplier name
a. Normalizing supplier name
b. Normalize DBA name
c. Legal entities, country names removed from normalized supplier name (same as VNE)
d. Check D & B number format: needs to be numeric and have a length of 9
e. Check TIN Number format: check if numeric
f. Check VAT Number format: check if numeric
g. Validate Phone Number format: check if of format (+91)(1234567891)
h. Validate email ID format: check if "@" and "." in email address
i. Extract email domain and remove all the domains that might be problematic (e.g. gmail, outlook etc)
j. Validate Fax Number format: same as phone number
k. Normalize Address: fetching longitude and latitude values from maps API and using it for exact matching.

Enriching ultimate parent as:
a. If an ultimate parent is provided by the user, that ultimate parent is used
b. Else cleansed supplier name (obtained above) is used to map Ultimate parent from data sources—Crawled data and Historic spend data
c. Normalize Ultimate parent: Same steps followed as above Clustering based on supplier name (fuzzy)
a. Abbreviations for supplier names are converted to full forms(Next task: instead of taking the first char, try with different combinations);
b. TF-IDF Vectors are generated for supplier name;
c. Density based Clustering performed;
d. Confidence bucket is calculated (Next task: optimize the code for this step. suggestion: use a windowing function)

Clustering based on unique fields (exact). A cluster is created on each field independently. All these clusters are mutually exclusive.
a. Done on the following fields:
  i. D & B
  ii. VAT
  iii. TIN
  iv. Phone Number
  v. Fax Number
  vi. Email ID
  vii. Address (longitude and latitude values)
  viii. Email Domain
b. A composite key of ultimate parent and the column being used for exact match is created and mapped to the supplier. Reason being that values for TIN, VAT etc tend to have a lot of noise in them and can cause the clusters to blow up;

Linking all the clusters

Dropping unnecessary columns from the file (format the file)
a. All intermediate columns are dropped
b. List of columns from above are maintained along with all the result columns.

Writing the file where the file is written as an excel or parquet depending on the input. Also, if data is read from a database (DB), it needs to be updated back.

Creating a JSON for the front-end web server/User Interface (UI) for example, as per requirements top 100 records are converted to a JSON Exporting the JSON for UI consumption and displaying on the UI for the user In an exemplary embodiment, the present invention provides a data processing system and method in supply chain application with faster processing times, reduced error and verification means for accurate results. The system utilizes sub network of devices and server for secured communication with reduced processing time due to automatic creation of data scripts by a bot utilizing AI processing to minimize the processing steps of data cleansing and normalization in supply chain application. The system includes dynamically creating data scripts based on nature of clusters for linking the clusters and achieving accurate results. The system enables data normalization, cleansing, de-duplication and removal or erroneous data from the database. Moreover, the data script enables processing of data in the supply chain application as either entity specific data processing or domain specific data processing or supply chain function specific data processing to achieve the desired results based on clustering. All of this results in a significant improvement in the overall functioning of a computer system as the clustering technique achieves faster data processing through the existing computing resources with more accurate results by linking clusters based on the data mapping script as generated by the AI engine where the AI engine identifies the clusters to be mapped for achieving more accurate and faster results and more scalable to very large datasets (for example, 1 billion data points).

In an embodiment, the data cleansing and normalization process may include multiple pre-processes including abbreviation, de-duplication, using natural language processing to clean names and graph database to calculate the similarity among received data and already existing clusters. The process takes an excel file from user of data with their detail through UI and outputs data along with their enriched attributes in an excel. It also displays a JSON table of top normalized data along with an analysis of the whole process like the percentage of data normalized and other key statistics. The application is containerized and stored in a docker container as it provides seamless integration between multiple environments, with the docker container acting as a lightweight and modular virtual machine. The input file is stored to a Blob and the coding layer hits the flask-based API exposed to it, deployed as a Web-application. This method provides scalability and reliability for application deployment. Then it connects to Blob Storage, File Storage and accesses various data files and config files along to run the process. The status file to be displayed and the log files are stored to tables. Table storage stores large amounts of structured data. Table storage is a No-SQL database which stores data in a key-value pair.

In an example embodiment, the data processing may include deduplication of received data. Some of the key variables used in deduplication are supplier name, parent name, contact details, email domain, category, and supplier manager. The accuracy improves even further with VAT Registration Number, TIN Number, Dun and Bradstreet Number, and Doing Business As (DBA) name. Further, the data processing may include deduplication of abbreviated names, mis-spelt names and partially filled names. Also, the system of the invention provides a real time deduplication API for data deduplication at the time of creation of profiles in supply chain application.

In another exemplary embodiment, the graph database of the system enables clustering of data received in real time basis. Since, speed is paramount a graph database that uses graph structures for semantic queries with nodes, edges and properties to represent and store data is utilized. In an advantageous aspect, the graph (or edge or relationship) directly relates data items. The graph databases are configured to allow simple and fast retrieval of complex hierarchical structures that are difficult to model in relational systems.

In an embodiment the data may be received from multiple sources. One such source is from purchase orders (PO) and invoices where a line item in the PO or invoice corresponds to one sample. Another source for data could be from the General Ledger (GL) which is maintained by the accounting team. Each sample thus has several attributes obtained from different sources. These attributes are the supplier name, PO description, GL description, invoice description and materials descriptions. The received data may be obtained from a document that requires conversion to extract the data. Any document like a PDF or JPG file would require conversion of images to text to obtain a data string which is then utilized for classification. Optical character recognition (OCR) techniques for conversion of a document like say invoice is used where computer vision and AI engine are configured for processing the invoice document to obtain the data. Since, OCR may have multiple accuracy issues at the time of extraction of data, the system of the present invention deploys an AI based processing of the extracted data to determine accuracy of extraction before the data is send for clustering.

In an example embodiment, a received dataset being an item related data may require a data extraction from a document. Data extraction from documents such as invoice, PO etc., with multiple characters or words is a tedious task. The data processing method of the present invention includes a region of interest script configured for identifying data attributes associated with the data object in the document where the region of interest script draws bounded box around the data attributes of the data object before cropping the data attributes in the drawn box and converting the data attributes to text for data extraction. The cropping could be done for any dataset in the supply chain application including supplier name, address, supplier data attributes, item data attributes, or any data string etc. If an invoice document with a supplier has already been worked on, then the attributes are identified using a region of interest (ROI) approach. The data object is then sent to OCR for image to text conversion. The text is searched for keywords matching header attributes. For addresses, a bounding box is drawn from the matching header keyword. This bounding box is drawn from the matching header keyword. The bounding box is cropped from the image and sent to an OCR for image to text. Pre-validations done on the extracted data before sending back to the user.

In a related embodiment, all the header fields extracted from an invoice document are successfully matched with the master tables. All the line items for a corresponding PO number are successfully matched with the Purchase Order tables.

In an exemplary embodiment, the AI based application takes the data object as an input, the invoice tables extract header and line level information from the invoices and sends the extracted text to the mapping layer. The mapping layer refers to the master tables and maps the extracted text with confidence thresholds and sends the mapped IDs back to the invoice module for consumption.

In an exemplary embodiment, the unsupervised clustering of supply chain application data including spend data is performed using CNN models. The present invention trains a data classifier on each level 1 label with the normalized taxonomy used as the output in a supervised learning setting. This data classifier is also used as a feature encoder as the feature space learned by this classifier at the prefinal layer captures a separable space across items. To perform item discovery, all the data belonging to a level 1 label is encoded through its corresponding level 1 classifier. The resultant feature vectors capture the semantic meaning of the line item description.

Figure 4:
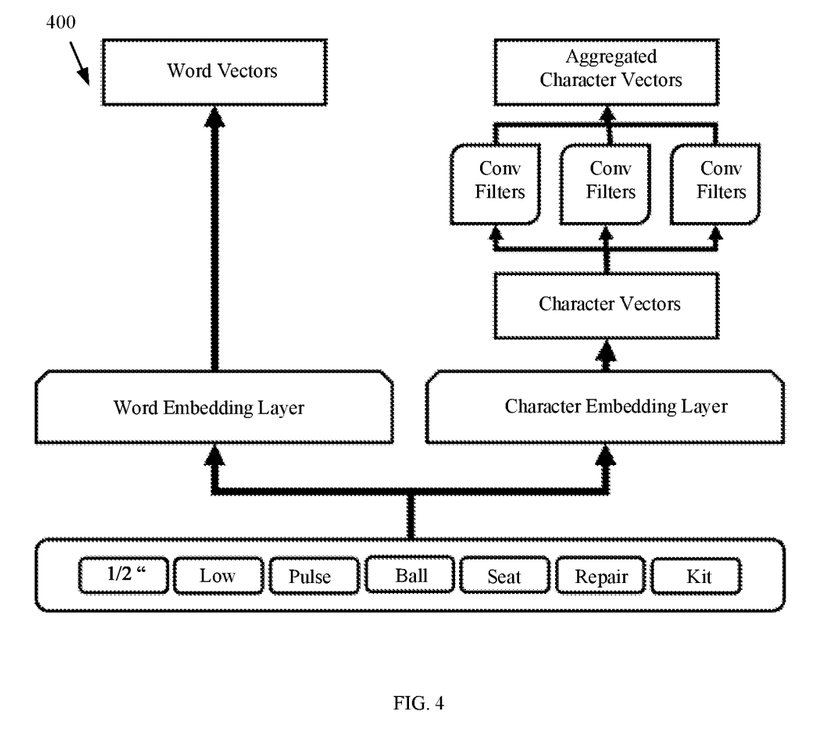
FIG. 4 is a block diagram showing concatenating words embedding with character embeddings in accordance with an embodiment of the invention.

In another exemplary embodiment, the present invention provides a nonparametric clustering method i.e. (DBSCAN) to be used on the feature vectors. Non-parametric clustering approach is used as the number of items that could be present can be unknown beforehand and it can also be a large number. The DBSCAN is applied in a hierarchical fashion where the hypermeters for the algorithm are recursively tuned until all the clusters detected in the data are less than hundred line-items. The clustering approach is applied to the data per level 4 label (FIG. 4). The level 4 label is most granular representation of categorization available through the data taxonomy. Further granularity can be achieved through the clustering approach. For example, clustering on a level 4 label of "Food" could result in "Indian meals", "Cakes", "Ice creams" etc.

In an embodiment, for data processing, the supplier name is used as one input and a concatenation of all descriptions is used as another input to a data model. Additionally, the supplier country and region used as inputs to the model as the description could vary depending on the source location. For example, a data string with supplier names, countries and regions also used as auxiliary input to the data classifier.

In one embodiment, description and supplier names can be noisy and reduce the performance of data classifier. To handle this problem, several preprocessing steps are performed to clean and enrich the descriptions. The system handles entities from multiple jurisdictions and the descriptions need not be in English. Translation to English may also be applied as a preliminary preprocessing step. Several keywords could also be repeated across different description attributes which is redundant information for the classifier. The keyword deduplication is also performed as a part of preprocessing. There could be some instances where detailed natural text descriptions are provided. To handle these samples, a pipeline of preprocessing is performed where frequently occurring words such as "the, an" are removed and word lemmatization is performed which results in a description like other samples.

In one embodiment, the received data may be structured or unstructured data. For received data like spend description that can be considered as short text containing a series of keywords without grammatical structure, a convolutional neural network is generated by the system that focuses on the presence of keywords rather than the sequence for feature extraction.

Figure 5:
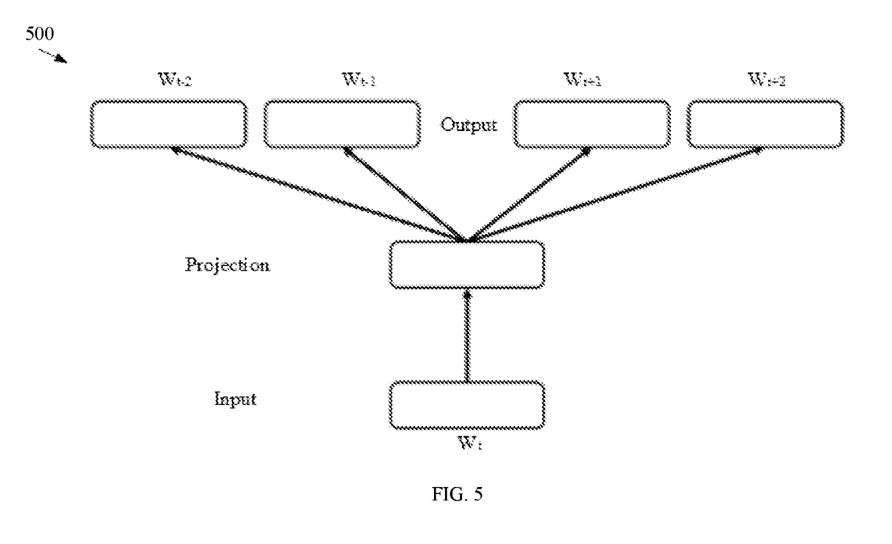
FIG. 5 is a skip-gram model of word embedding in accordance with an embodiment of the invention.

In an example embodiment, One-dimensional convolutions are performed on the sequence of word embedding vectors provided as inputs. Word embeddings are learned representations for text, where similar words have similar representations. Specifically, contextual embeddings are trained on the data corpus per industry and is quite useful for supply chain application data. The word embeddings are trained using the skip gram model 500 where the current word embedding is used to predict the word embedding of the surrounding context as shown in FIG. 5. The embeddings trained using the "fasttext" framework follow a skip-gram model maximizing the following log likelihood equation:

$$\mathcal{L} = \sum_{t=0}^{T} \sum_{c \in C_t} \log(p(w_c | w_t)),$$

where context $C_t$ is the set of indices of words surrounding the word $w_t$. Each word $w_t$ is represented as a combination of multiple character n-grams.

In an exemplary embodiment, supply chain application descriptions can include several numeric attributes and industry specific keywords. These are encoded as out-of-vocabulary (OOV) w.r.t the word embeddings. However, such attributes could contain useful information for data processing. For example, the numeric attribute of "16-inch" cannot belong to the Travel-expense category in case of a spend function of the supply chain application. Character embeddings are used to represent such OOV words where each character in the word is represented by a D dimensional vector and the vectors of all characters in a word are aggregated using a character level convolutional neural network (CNN).

In one embodiment, description and supplier names can be noisy and reduce the performance of data classifier. To handle this problem, several preprocessing steps are performed to clean and enrich the descriptions. The system handles entities from multiple jurisdictions and the descriptions need not be in English. Translation to English is applied as a preliminary preprocessing step. Several keywords could also be repeated across different description attributes which is redundant information for the classifier. As explained earlier, keyword deduplication is also performed as a part of preprocessing. There could be some instances where detailed natural text descriptions are provided. To handle these samples, a pipeline of preprocessing is performed where frequently occurring words such as "the, an" are removed and word lemmatization is performed which results in a description like other samples.

In an exemplary embodiment, the present invention may be a system, a method, and/or a computer program product. The computer program product may include a computer readable storage medium (or media) having computer readable program instructions thereon for causing a processor to carry out aspects of the present invention. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device i.e it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

What is claimed is:

1. A data processing method for supply chain application, the method comprises:
    receiving and analyzing one or more dataset to assign a unique identifier to the received dataset;
    normalizing one or more data fields associated with each of the one or more dataset to generate a normalized dataset;
    enriching a parent data through mapping of the parent data by the normalized dataset;
    processing the normalized dataset through tokenization and vectorization to generate sparse vectors; and
    clustering the one or more normalized dataset based on the one or more data fields and the sparse vectors wherein one or more clusters is created on one or more data attribute associated with each of the one or more data fields and each of the clusters are linked.

2. The method of claim 1 wherein a data object of the received dataset is analyzed and abbreviated before mapping the parent data with abbreviated data object wherein the mapping of the parent data is executed by a bot through a data mapping script.

3. The method of claim 1 wherein the one or more data field includes name, address, email ID, service ID, tax number, contact number, unique IDN, item master ID, item data attributes or a data string extracted from a data source.

4. The method of claim 3 wherein clustering based on name as data field includes the step of:
    vectorization by generating character wise TF-IDF vectors as the sparse vectors for at least one of the one or more tokenized data fields;
    normalizing the TF-IDF vectors;
    determining distance between normalized TF-IDF vectors and cluster center of the TF-IDF vectors by:
    $d(P, q) = sqrt(sum\_i(q\_i - P\_i)^2))$
    where, P is a centre of a cluster which is determined as a mean of all TF-IDF vectors of data points within that cluster;
    q is TF-IDF vector of the cluster;
    $q\_i$ is TF-IDF weight of $i^{th}$ word determined as a raw count in the data name normalized by inverse document frequency (IDF) of the data name across a corpus;
    $P\_i$ is a mean of TF-IDF weight of the $i^{th}$ word across all the TF-IDF vectors in the cluster.

5. The method of claim 2 wherein the mapping of the parent data is obtained from a crawl dataset and a historical spend dataset.

6. The method of claim 3 wherein the address data field enables clustering by longitude and latitude information.

7. The method of claim 4 further comprises storing a plurality of graph structures in a graph database for semantic queries with nodes, edges and properties to represent and store data.

8. The method of claim 7 further comprises:
    creating an empty graph;
    adding data field as vertices of the graph;
    plotting the clusters based on individual attributes as nodes on the graph;
    connect the clusters using the edges based on clusters formed on each columns;
    extracting one or more disconnected sub-graphs and assigning each sub-graph a cluster identifier; and
    mapping the assigned duster identifier to the dataset using nodes.

9. The method of claim 1 further comprises dynamically setting by an AI engine, a threshold epsilon value based on the received dataset for clustering to obtain a cluster identifier Or label.

10. The method of claim 4 wherein a cluster confidence value is determined based on the distance from the center and density-based clustering.

11. A data processing System for supply chain application, the system comprises:
    a server configured to receive and analyze one or more dataset for assigning a unique identifier to the received dataset;
    a controller encoded with instructions enabling the controller to function as a bot for initiating a data cleansing and normalization operation for normalizing one or more data fields associated with each of the one or more dataset to generate a normalized dataset;
    data enrichment tool configured for enriching a parent data through mapping of the parent data by the normalized dataset; and
    a processor configured to process the normalized dataset through tokenization and vectorization to generate sparse vectors; and
    an AI engine coupled to the processor for clustering the one or more normalized dataset based on the one or more data fields and the sparse vectors wherein one or more clusters is created on one or more data attribute associated with each of the one or more data fields and each of the clusters are linked.

12. The system of claim 11 wherein a data object of the received dataset is analyzed and abbreviated before mapping the parent data with abbreviated data object wherein the mapping of the parent data is executed by a bot through a data mapping script stored in a data script database.

13. The system of claim 11 wherein the one or more data field includes name, address, email ID, service ID, tax number, contact number, unique IDN, item master ID, item data attributes or a data string extracted from a data source.

14. The system of claim 11 wherein the processor is configured to perform clustering based on name as data field, wherein the processor is configured to:
    vectorize by generating character wise TF-IDF vectors as the sparse vectors for at least one of the one or more tokenized data fields;
    normalize the TF-IDF (Term frequency-Inverse document frequency) vectors;
    determine distance between normalized TF-IDF vectors and respective cluster center by:
    $d(P, q) = sqrt(sum\_i(q\_i - P\_i)^2))$
    where, P is a centre of a cluster which is determined as a mean of all TF-IDF vectors of data points within that cluster;
    q is TF-IDF vector of the cluster;
    $q\_i$ is TF-IDF weight of $i^{th}$ word determined as a raw count in the data name normalized by inverse document frequency (IDF) of the data name across a corpus;
    $P\_i$ is a mean of TF-IDF weight of the $i^{th}$ word across all the TF-IDF vectors in the cluster.

15. The system of claim 12 further comprises a crawl dataset database and a historical spend dataset database wherein the mapping of the parent data is obtained from a crawl dataset and a historical spend dataset.

16. The system of claim 13 wherein the address data field enables clustering by longitude and latitude.

17. The system of claim 14 further comprises a graph database configured to store a plurality of graph structures for semantic queries with nodes, edges and properties to represent and store data.

18. The system of claim 17, wherein the AI engine is configured to:
 create an empty graph;
 add data field as vertices of the graph;
 plot the clusters based on individual attributes as nodes on the graph;
 connect the plotted clusters using the edges;
 extract one or more disconnected sub-graphs and assigning each sub-graph a cluster identifier; and
 map the assigned cluster identifier to the dataset using nodes.

19. The system of claim 18 wherein the server includes a front end web server communicatively coupled to at least one SQL server, wherein the front end web server is configured to reprocess the clustering based on the data script by receiving at least one cluster processed by the SQL server and applying an AI based dynamic processing logic to the cluster to automate a cluster linking operation.

20. A computer program product for data processing in supply chain application of a computing device with memory, the product comprising:
 a computer readable storage medium readable by a processor and storing instructions for execution by the processor for performing a method, the method comprising:
  receiving and analyzing one or more dataset to assign a unique identifier to the received dataset;
  normalizing one or more data fields associated with each of the one or more dataset to generate a normalized dataset;
  enriching a parent data through mapping of the parent data by the normalized dataset;
  processing the normalized dataset through tokenization and vectorization to generate sparse vectors; and
  clustering the one or more normalized dataset based on the one or more data fields and the sparse vectors wherein one or more clusters is created on one or more data attribute associated with each of the one or more data fields and each of the clusters are linked.

* * * * *